(No Model.) 2 Sheets—Sheet 1.

R. RICHEY & W. R. FROST.
AUTOMATIC CORN PLANTER.

No. 437,243. Patented Sept. 30, 1890.

(No Model.) 2 Sheets—Sheet 2.
R. RICHEY & W. R. FROST.
AUTOMATIC CORN PLANTER.
No. 437,243. Patented Sept. 30, 1890.
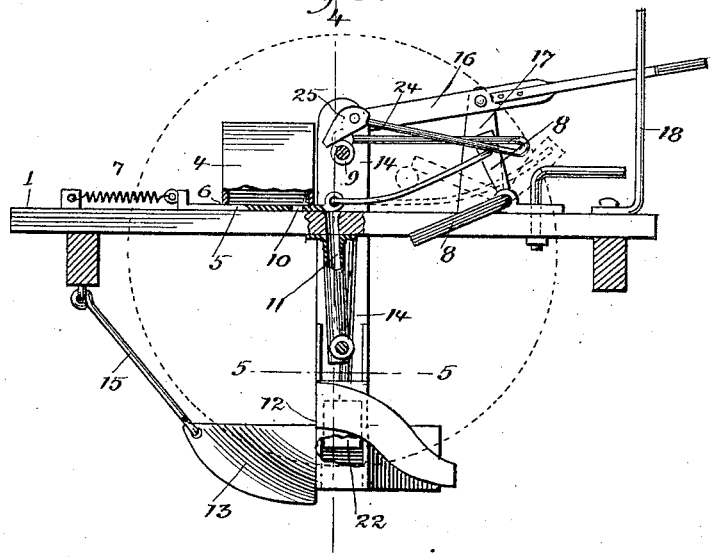
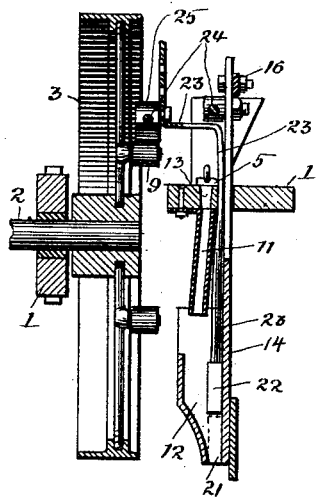
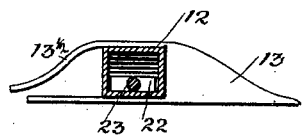
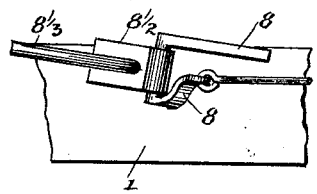
Witnesses:
S. C. Starg
T. Frost
Inventors:
Robert Richey
William R. Frost
By John W. Richey
Attorney.
THE NORRIS PETERS CO., PHOTO-LITHO., WASHINGTON, D. C.

UNITED STATES PATENT OFFICE.

ROBERT RICHEY AND WILLIAM R. FROST, OF BELFAST, IOWA.

AUTOMATIC CORN-PLANTER.

SPECIFICATION forming part of Letters Patent No. 437,243, dated September 30, 1890.

Application filed April 18, 1890. Serial No. 348,579. (No model.)

*To all whom it may concern:*

Be it known that we, ROBERT RICHEY and WILLIAM R. FROST, of Belfast, in the county of Lee and State of Iowa, have invented certain new and useful Improvements in Automatic Corn-Planters, of which the following is a specification.

Our invention relates to check-row corn-planters; and the objects of our improvement are, first, to provide means for stamping the ground alongside the row, whereby the cross or check rows are formed; second, to arrange the planter in line with the axle and provide means for affording a uniform depth of planting; third, to provide means for automatically operating the droppers; fourth, to provide means in connection with the drive-wheels for leveling the ground and removing obstructions in front of the drive-wheels; fifth, to provide means whereby the dropping will be made simultaneously in the two rows at opposite sides of the machine, and, sixth, to provide handles for lifting the planter over from row to row, or rather for adjusting it when at the end of rows. These objects we have attained by the machine as illustrated in the accompanying drawings.

Figure 1:
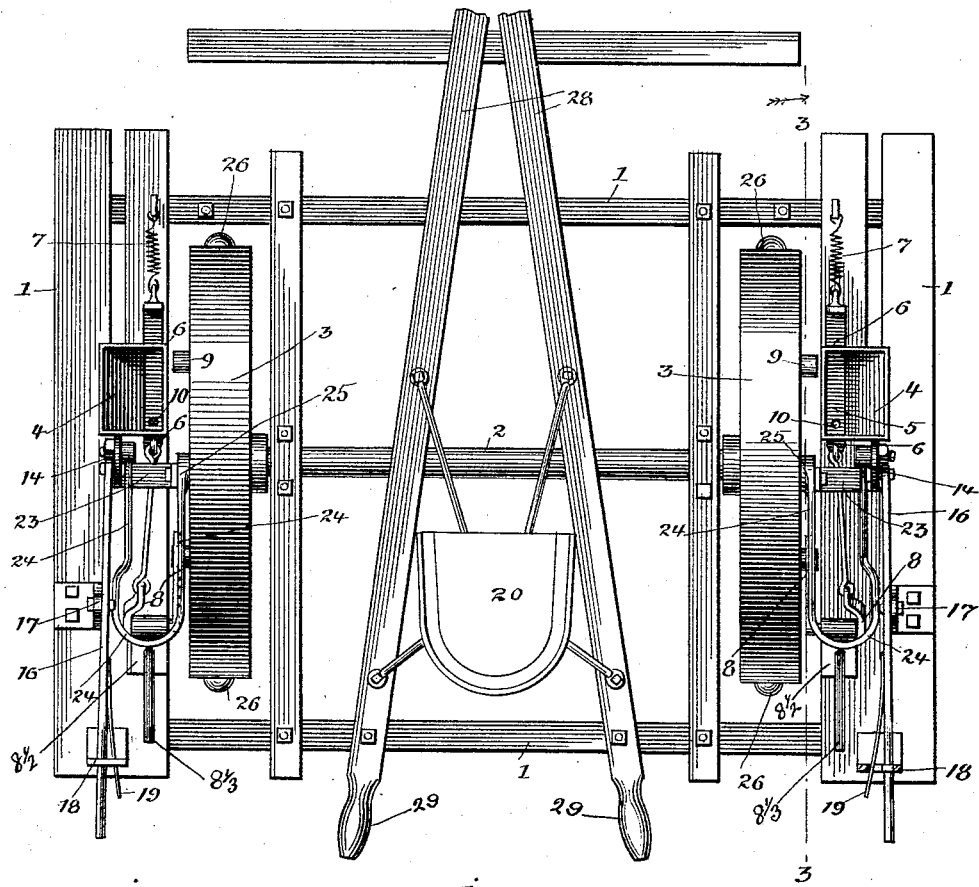
Figure 2:
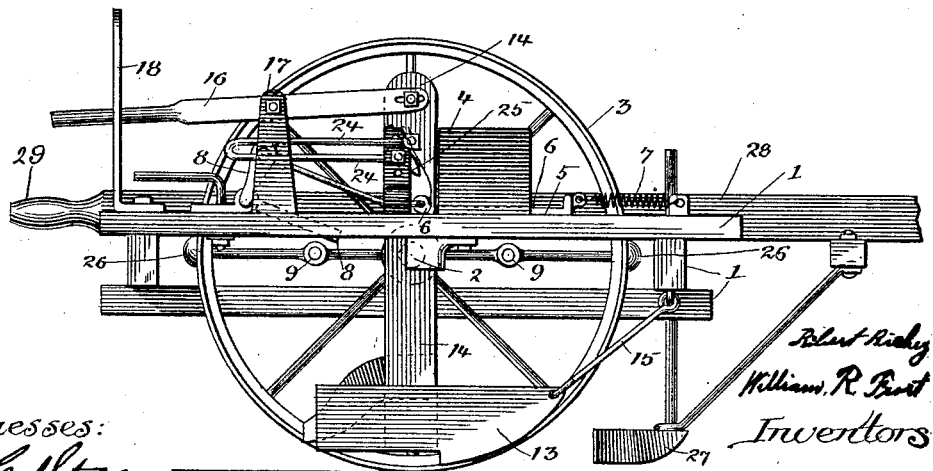

Figure 1 is a top or plan view of our improved machine. Fig. 2 is a side elevation of the same. Fig. 3 is a vertical section taken on the line 3 3' of Fig. 1. Fig. 4 is a fragment of a vertical cross-section taken on the line 4 4' of Fig. 3. Fig. 5 is a fragment of a horizontal section taken on the line 5 5' of Fig. 3. Fig. 6 is a detail showing a fragment of the frame and a bell-crank lever for operating a slide-valve in enlarged plan view.

In the drawings, the reference-numeral 1 designates the truck or frame of the machine or apparatus; 2, the axle, and 3 the drive-wheels, on which said frame is mounted. Said wheels are fastened rigidly to the axle, so as to revolve together.

Reference-numeral 4 designates the hoppers, mounted one upon each side of the frame above a reciprocating dropper-valve 5', one of which is arranged in the bottom of each hopper. Said dropper-valve moves in guides or openings 6 in the bottom of the hoppers. A retractile spring 7 is secured at one end to each of said dropper-valves and at the other end to the frame or stationary part of the machine in such manner as to retain the said dropper-valves in their normal positions and return them after being shifted to effect the dropping. A bell-crank 8 is pivoted to the frame at the rear of each of said dropper-valves, the upper arm of said levers being connected by a link to the dropper-valve and the lower arm being projected inside the frame and within the track or path of cams 9, arranged upon each side of the drive-wheels. These cams are secured to the drive-wheels on opposite sides in such manner as to operate the dropper-valve twice in every revolution of the drive-wheels. They are also located in the same plane on opposite sides of the machine, so as to operate said dropper-valves on both sides of the machine at the same time. Said dropper-valves are provided with openings 10 of the required size to hold sufficient seed for a single hill, and as they are drawn backward by the rocking of the bell-cranks they are carried over drop-tubes 11 and drop the seed down said tubes. These drop-tubes are secured to the frame and extended down sufficient to conduct the seed into the boxes 12 at the rear of plows 13.

The plows or openers are secured to standards 14, which are secured to the frame in such manner as to be raised and lowered on the frame for regulating the depth of planting. At the rear of the planters, and on the side next to the drive-wheels, we provide coverers 13½, which are inclined inward in front and outward at the rear, so that the front gathers in the soil and the rear shoves it out into the furrows, filling them up and covering the corn.

The plows or openers 13 are connected at their front ends by pivotal brace-rods or links 15 to the frame of the machine in such manner as to support the standards 14, and to permit them to be raised and lowered for regulating the depth of planting. For the purpose of raising and lowering said standards, we provide levers 16, which are pivotally attached to the upper end of said standards and to upwardly-projecting arms 17 of the frame. The long end of these levers pass through slotted standards 18, which have ratchets or notches on one side of the slots for holding said levers in different positions in the slots, each of said levers having a spring 19, which bears against the opposite side of the slots for forcing and holding the lever in the notches. The rear or long ends of said levers are so arranged relatively to the driver's seat 20 that the driver can reach and operate said levers from the seat.

Each of the planter-boxes 12 is provided with a seed-opening 21 at the bottom, which is closed by a valve or plunger 22. Said valves are attached each to a rod 23, which runs up on the inside of the standards 14 through an opening in the front, and is bent inward toward the drive-wheels, as shown in Fig. 4, and connected to a spring 24, which spring has one of its ends connected to the standard 14 and the other end connected to a cam 25 on said rod 23. Said cams 25, there being one on each side of the machine, project within the paths of the cams 9 of the drive-wheels, and the valves 22 are raised or opened to allow the seed to pass through the openings 21, and as soon as the cams 9 pass the cams 25 the latter drop or spring down and force the valve 22 down, so as to close the opening 21 and prevent the seed for the next hill from passing out prematurely.

The dropper-valves 5 and the valves 22 and their operating mechanism are so arranged relatively to one another that the valve-plunger 22 will be closed when the valve 5 is open, and vice versa.

The bell-cranks 8 are secured to the frame by means of swivel-plates 8½, which are provided, respectively, with a handle 8⅓, whereby when the lower arms of said bell-crank are raised above the frame said plates may be swiveled or turned so as to bring said lower arms over and rest them upon the frame, as shown in Fig. 6. In this position said arms are thrown out of the path of the cams 9, and the valves 5 will remain closed or out of gear.

The tires of the drive-wheels are provided with semi-globular projections 26, which are placed opposite to or directly in line with cams 9 for the purpose of marking the ground in line with the hills of corn, said projections striking the ground at the same instant that the corn is dropped from the planter-boxes 12. Scrapers or plows 27 are provided and supported in front of the drive-wheels for removing obstructions and cleaning the way in front of the drive-wheels.

The tongue of the machine 28 is bolted to the frame 1 in the usual manner for guiding the machine. At the rear the tongue is provided with handles 29, whereby the machine may be lifted at the end of rows for the purpose of starting the progressive rows at the proper distance from the previously-planted rows.

It is not necessary that the ground be previously marked for this planter. The plows or openers 13 will form shallow furrows, which indicate the rows in one direction, and the projections 26 on the tires of the wheels will indicate the check-rows in the other direction, and also furnish a guide to the driver, whereby he can determine the instant in which the planting is done. A quantity of seed is placed in the hoppers 4 with enough for one hill in each of the planter-boxes 12. The machine is started with the front of the plows 13 touching the edge of the ground to be planted, with one of the projections 26 opposite the front of said plows. Starting thus and driving across the field the machine plants two rows of corn in hills at a distance of half the circumference of the wheels apart, the positions of the hills being marked by the track of the projections 26. On turning round the dropper-valves should be first thrown out of gear and the planter-boxes and cams 25 be raised out of the ground and out of gear with the cams 9. Then the machine is turned and brought into position for the next rows by means of the handles 29, it being observed, before starting, that the projections 26 will fall in line with the hills in the rows previously planted, after which the machine is thrown into gear and driven across the field, as before, at the proper distance from the rows previously planted.

Having thus described our invention, what we claim, and desire to secure by Letters Patent, is—

In a corn-planter, the combination of the droppers supported by the main frame on the outside and in line with the drive-wheels, substantially as described and shown.

ROBERT RICHEY.
WILLIAM R. FROST.

Witnesses:
S. C. STARR,
T. FROST.